United States Patent
Quisumbing

(10) Patent No.: US 10,628,182 B2
(45) Date of Patent: Apr. 21, 2020

(54) GENERATION OF AN INSTRUCTION GUIDE BASED ON A CURRENT HARDWARE CONFIGURATION OF A SYSTEM

(71) Applicant: Pure Storage, Inc., Mountain View, CA (US)

(72) Inventor: Benjamin N. Quisumbing, Mountain View, CA (US)

(73) Assignee: PURE STORAGE, INC., Mountain View, CA (US)

( * ) Notice: Subject to any disclaimer, the term of this patent is extended or adjusted under 35 U.S.C. 154(b) by 800 days.

(21) Appl. No.: 15/207,381

(22) Filed: Jul. 11, 2016

(65) Prior Publication Data

US 2018/0011721 A1    Jan. 11, 2018

(51) Int. Cl.
*G06F 9/451* (2018.01)
*G06F 3/06* (2006.01)

(52) U.S. Cl.
CPC ............ *G06F 9/453* (2018.02); *G06F 3/0607* (2013.01); *G06F 3/0631* (2013.01); *G06F 3/0689* (2013.01)

(58) Field of Classification Search
CPC ............................... G06F 9/4451; G06F 9/453
USPC .......................................................... 715/709
See application file for complete search history.

(56) References Cited

U.S. PATENT DOCUMENTS

| | | | | |
|---|---|---|---|---|
| 5,751,575 A | * | 5/1998 | Hirosawa | G06F 17/50 700/16 |
| 6,134,614 A | * | 10/2000 | Chari | G06F 9/4411 706/11 |
| 6,134,615 A | * | 10/2000 | Chari | G06F 9/4411 706/11 |
| 6,286,056 B1 | | 9/2001 | Edgar et al. | |
| 6,564,375 B1 | * | 5/2003 | Jiang | G06F 9/453 717/165 |
| 6,804,703 B1 | | 10/2004 | Allen et al. | |
| 6,954,881 B1 | | 10/2005 | Flynn Jr. et al. | |
| 7,124,367 B2 | * | 10/2006 | Anderson | G06F 3/0481 715/735 |
| 7,139,907 B2 | | 11/2006 | Bakke et al. | |
| 7,272,674 B1 | | 9/2007 | Nandi et al. | |

(Continued)

OTHER PUBLICATIONS

TDB-ACC-No. NN8903371, Disclosure Title: System Upgrade Utility (Customer Configuration) Publication-Data: IBM Technical Disclosure Bulletin, Mar. 1989, US vol. No. 31 Issue No. 10 p. 371-374 Publication-Date:Mar. 1, 1989 (Mar. 1, 1989) Cross Reference:0018-8689-31-10-371 (Year: 1989).*

(Continued)

*Primary Examiner* — Li P Sun
*Assistant Examiner* — Henry Orr
(74) *Attorney, Agent, or Firm* — Womble Bond Dickinson (US) LLP; Daniel E. Ovanezian

(57) ABSTRACT

Information identifying a current hardware configuration of a system may be received. Furthermore, information of a new hardware component that has not been installed may be received. A graphical user interface (GUI) may be provided with an option to install the new hardware component with the system. In response to a selection from the GUI of the option to install the new hardware component with the system, a plurality of actions to install the new hardware component with the current hardware configuration of the system may be determined. A guide may be generated based on the determined plurality of actions.

23 Claims, 11 Drawing Sheets

(56) References Cited

U.S. PATENT DOCUMENTS

| | | | |
|---|---|---|---|
| 7,313,636 B2 | 12/2007 | Qi | |
| 7,577,802 B1 | 8/2009 | Parsons | |
| 7,587,713 B1* | 9/2009 | Barrett | G06F 9/451 |
| | | | 717/168 |
| 8,103,754 B1 | 1/2012 | Luong et al. | |
| 8,301,811 B1 | 10/2012 | Wigmore et al. | |
| 8,645,649 B2 | 2/2014 | Kaiya et al. | |
| 9,063,937 B2 | 6/2015 | McDowell et al. | |
| 9,229,700 B2* | 1/2016 | Subramanya | G06F 8/65 |
| 9,294,567 B2 | 3/2016 | Hussain et al. | |
| 9,430,412 B2 | 8/2016 | Huang | |
| 9,495,145 B1* | 11/2016 | Brech | G06F 8/65 |
| 9,501,245 B2 | 11/2016 | Hussain et al. | |
| 9,565,269 B2 | 2/2017 | Malwankar et al. | |
| 9,824,608 B1* | 11/2017 | Lin | G09B 19/0053 |
| 2004/0098314 A1* | 5/2004 | Cool | G06F 8/61 |
| | | | 705/26.5 |
| 2004/0104939 A1* | 6/2004 | Locke | G06F 17/243 |
| | | | 715/764 |
| 2005/0057973 A1* | 3/2005 | Khatami | G11C 16/20 |
| | | | 365/185.33 |
| 2007/0111568 A1* | 5/2007 | Ferrari | H04L 12/2807 |
| | | | 439/131 |
| 2008/0034167 A1 | 2/2008 | Sharma et al. | |
| 2009/0195363 A1* | 8/2009 | Downie | G06K 5/02 |
| | | | 340/10.4 |
| 2012/0226986 A1* | 9/2012 | Eischeid | G06F 11/3006 |
| | | | 715/736 |
| 2012/0246630 A1* | 9/2012 | Kuzins | G06F 8/61 |
| | | | 717/169 |
| 2015/0019798 A1 | 1/2015 | Huang | |
| 2015/0026076 A1* | 1/2015 | CaraDonna | G06Q 30/016 |
| | | | 705/304 |
| 2015/0026077 A1* | 1/2015 | CaraDonna | G06Q 30/016 |
| | | | 705/304 |
| 2015/0026621 A1* | 1/2015 | CaraDonna | G06F 17/50 |
| | | | 715/771 |
| 2015/0032867 A1* | 1/2015 | Lihosit | H04L 41/082 |
| | | | 709/221 |
| 2015/0095788 A1* | 4/2015 | Thiele | G06F 3/0482 |
| | | | 715/735 |
| 2016/0011752 A1* | 1/2016 | Subramanian | G06F 8/61 |
| | | | 715/747 |
| 2016/0112262 A1* | 4/2016 | Johnson | G06F 9/45504 |
| | | | 709/221 |
| 2016/0299750 A1* | 10/2016 | Koniges | G06F 8/61 |
| 2017/0024166 A1 | 1/2017 | Singh et al. | |

OTHER PUBLICATIONS

NetApp EF550 Flash Array Installation Guide, Release Date: Dec. 2013 pp. 1-77 (Year: 2013).*

HP D2200sb Storage Blade QuickSpec, published date: Oct. 28, 2011 pp. 1-15 (Year: 2011).*

Ouyang, J. et al. (Mar. 1-5, 2014) "SDF: Software-Defined Flash for Web-Scale Internet Storage Systems", ASPLOS 2014, 14 pages.

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

* cited by examiner

GENERATION OF AN INSTRUCTION GUIDE BASED ON A CURRENT HARDWARE CONFIGURATION OF A SYSTEM

BACKGROUND

The installation of a hardware component may involve the integration of the component with existing hardware of a system or the setting up of the hardware component as a new system. For example, in storage systems, the hardware component may be used to add to the storage capacity of an existing storage system or may be set up as a new storage system.

The hardware component may be ordered by an administrator or user of the storage system and the administrator or user may be provided with installation instructions to install the hardware component. The installation instructions may be provided in a documentation that provides a sequence of steps to install the hardware component with different types of systems.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
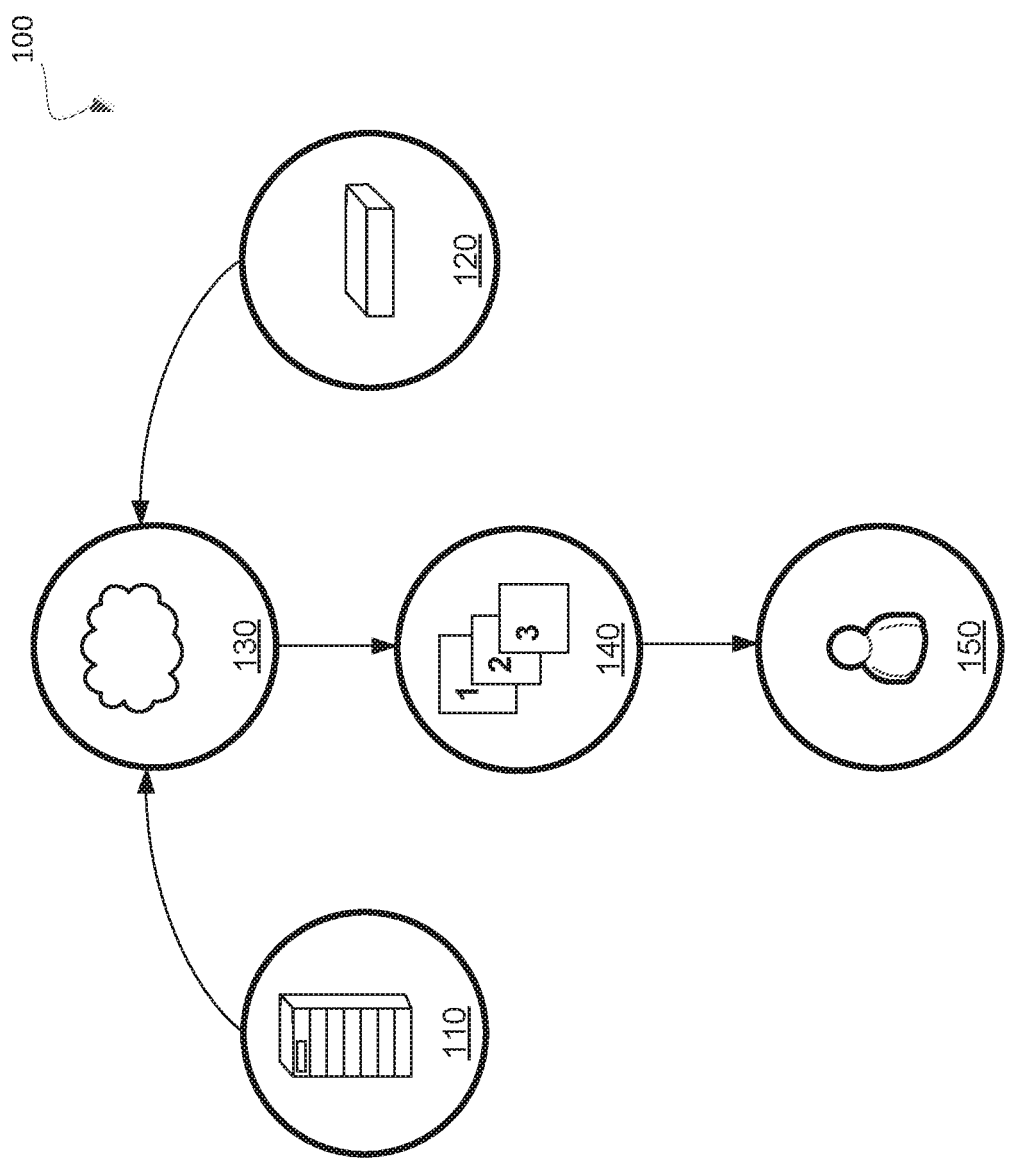
FIG. 1 illustrates an example environment to generate an instruction guide based on an existing hardware configuration in accordance with some embodiments of the present disclosure.

Aspects of the present disclosure relate to the generation of an instruction guide based on a current or existing hardware configuration of a system. A solid-state storage array, such as a flash storage array, may include multiple hardware components such as storage controllers or storage shelves that add storage capacity to the flash storage array. For example, the flash storage array may include one storage shelf and two storage controllers as part of a current hardware configuration. At a later time, an administrator of the flash storage array may add to the storage capacity of the flash storage array by ordering a new storage shelf that is to be installed with the current hardware configuration (e.g., the other storage shelf and the storage controllers) of the flash storage array. For example, cables may be connected from portions of the new storage shelf to portions of the existing storage shelves of the current hardware configuration, software used by the storage controller of the flash storage array may be upgraded, etc. An administrator of the flash storage array may also increase the data throughput of the flash storage array by ordering two storage controllers with higher performance components that would replace currently installed storage controllers. Alternatively, the administrator may set up a new flash storage array with the newly ordered storage shelf and new storage controllers.

When a new hardware component is provided to the administrator, hardware documentation may be included with the new hardware component to provide instructions to install the new hardware component in various ways. For example, the hardware documentation may provide information to install the new hardware component with different types of hardware configurations as well as instructions to install the new hardware component as a new flash storage array. Thus, while the hardware documentation may provide multiple sequences to install the new hardware component, the administrator may only use a portion of the hardware documentation to install the new hardware component. As such, the providing of hardware documentation that provides many different sequences to install the new hardware component may cause the administrator to review unnecessary documentation to install the new hardware component.

Aspects of the present disclosure address the above and other deficiencies by generating an instruction guide based on a current hardware configuration of a system. The instruction guide may provide a sequence of actions to install a new hardware component that has been ordered based on a current hardware configuration of the system. For example, the instruction guide may provide a sequence of actions that are specific to install a new solid-state storage array component (e.g., a flash storage array component) with other hardware components of an existing solid-state storage array (e.g., a flash storage array system) or to install or set up the new solid-state storage array component as a new solid-state storage array while not providing other sequences for installing the new solid-state storage array component with other hardware configurations of other solid-state storage arrays.

As an example, a user may order a new storage shelf (e.g., the new flash storage array component). The user may access a graphical user interface (GUI) that provides information for each flash storage array that is administered by the user. In response to the user selecting, from the GUI, an identification of a particular flash storage array, the GUI may provide an option to install the new storage shelf with the selected flash storage array. If the user proceeds with the option to install the new storage shelf with the selected flash storage array, then the GUI may generate and provide an instruction guide that provides a series of installation actions to perform the actions that are specific for installing the new storage shelf with the selected flash storage array while not providing any actions to install the new storage shelf with other flash storage array configurations.

As such, an instruction guide may be generated based on a current hardware configuration of a system (e.g., the flash storage array) and a new hardware component (e.g., a new storage shelf). The instruction guide may identify a series of installation actions that are to be performed to install the new hardware component with the current hardware configuration of the system. For example, multiple actions may be available and specific actions that are relevant to both the new hardware component and the current hardware configuration may be selected from among the available multiple actions. Additionally, the installation actions that are selected to be provided in the instruction guide may be based on user preferences and local system preferences as described in further detail below.

FIG. 1 illustrates an example environment 100 to generate an instruction guide based on a current hardware configuration. In general, the environment 100 may include a guide component 130 that may receive information identifying a current hardware configuration of a system and information identifying a new hardware component to generate an instruction guide.

As shown in FIG. 1, the environment 100 may include a guide component 130 that may correspond to a server. The guide component 130 may receive information that identifies a current hardware configuration of a system. For example, a flash storage array system 110 may periodically transmit information to the server. In some embodiments, multiple flash storage array systems may each transmit information to the server. The information transmitted by the flash storage array system 110 may identify hardware components currently used in the hardware configuration of the flash storage array system 110, a version of software used by the flash storage system 110, and other status information of the flash storage array system 110. Further details with regard to the information transmitted by the flash storage array system 110 are described in conjunction with FIG. 2. The guide component 130 may further receive order information of a guide component 130. For example, the information may be provided from a database or a customer relationship management (CRM) server that provides information of new hardware components that have been ordered by a user of the flash storage array system 110.

The guide component 130 may determine installation actions to be provided in an instruction guide and may provide a graphical user interface which may be used to provide an instruction guide 140. For example, the instruction guide 140 may identify one or more installation actions and necessary steps to complete the installation actions to install the new hardware component 120 with the current hardware configuration of the flash storage array system 110 as described in further detail in conjunction with FIGS. 2-6. A user or administrator 150 may subsequently use the generated instruction guide 140 to install the new hardware component 120 with the current hardware configuration of the flash storage array system 110.

Figure 2:
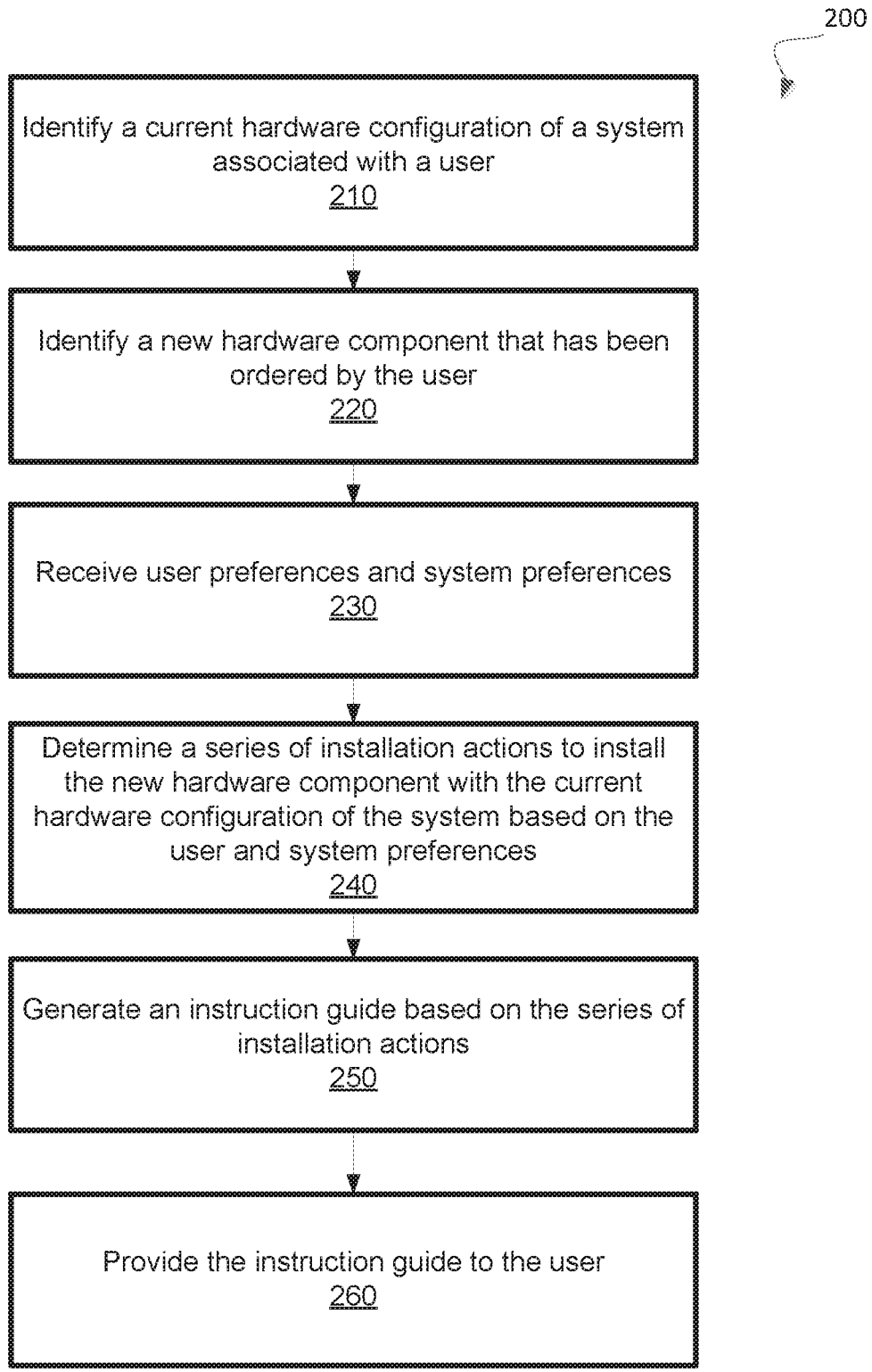
FIG. 2 is an example method to generate an instruction guide in accordance with one or more aspects of the present disclosure.

FIG. 2 is an example method 200 to generate an instruction guide. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the guide component 130 of FIG. 1 may perform the method 200.

As shown in FIG. 2, the method 200 may begin with the processing logic identifying a current hardware configuration of a system associated with a user (block 210). For example, information transmitted over a network from flash storage array systems may be received. The information may identify the hardware components currently used in the hardware configuration of a flash storage array system. For example, the information may identify that the hardware configuration currently includes a certain number of storage shelves for the flash storage array, particular types of storage controllers, particular types of Storage Area Network (SAN) connections (e.g., a Fibre Channel (FC) or Internet Small Computer System Interface (iSCSI) connection between the controllers and other SAN equipment that is external to the flash storage array), and/or a particular type of connection between the hardware components of the current hardware configuration (e.g., a Serial Attached SCSI (SAS) connection between the storage controllers and storage shelves of the hardware configuration). The information may further identify a particular version of software used in the flash storage array system where the software may correspond to an operating environment that provides memory management services for data stored in the flash storage array system. In some embodiments, the information identifying the current hardware configuration of the system may be received over a network from the system, or from a physical connection with the system. The processing logic may further identify a new hardware component that has been ordered by the user (block 220). For example, a database including new orders of hardware components may transmit ordering information that identifies users of flash storage array systems and hardware components ordered by the users. In some embodiments, information identifying the new hardware component may be received from a short-range wireless connection or an optical scan associated with the new hardware component. The processing logic may receive user preferences and system preferences (block 230). The user preferences may identify installation actions that are known to the user and where the user has indicated that he or she does not need to view the particular installation actions identified from the user preferences. For example, the user preferences may indicate that the user is familiar with the process to upgrade a version of software of the flash storage array and thus does not need to view an installation action describing how to upgrade the version of the software. The system preferences may indicate local system preferences for a particular system as well as information specifying a particular order or arrangement of hardware components used in the current hardware configuration of a system.

Referring to FIG. 2, the processing logic may determine a series of installation actions to install the new hardware component with the current hardware configuration of the system based on the user and system preferences (block 240). For example, multiple installation actions may be identified and filtered to identify a subset of the available installation actions that are relevant to installing the new hardware component to the specific current hardware configuration and the user preferences. Further details with regard to determining the series of installation actions are described in conjunction with FIGS. 3 and 4. The processing logic may further generate an instruction guide based on the series of installation actions (block 250) and provide the instruction guide to the user (block 260). For example, the instruction guide may be provided via the GUI as further described in conjunction with FIGS. 5A-5E.

In some embodiments, the current hardware configuration may be received with a cable or other such connector with the system (e.g., the flash storage array system). For example, the system may not be coupled with a network, but may include a port or other such input (e.g., a Universal Serial Bus (USB) port) where a cable or connector may be coupled with the input port to receive the current hardware configuration of the system. Furthermore, the identification of the new hardware component may be received in response to a scanning of a code (e.g., a matrix bar code such as a Quick Response (QR) code) or from a short-range wireless connection (e.g., a Radio Frequency Identification (RFID) signal from a transponder).

Figure 3:
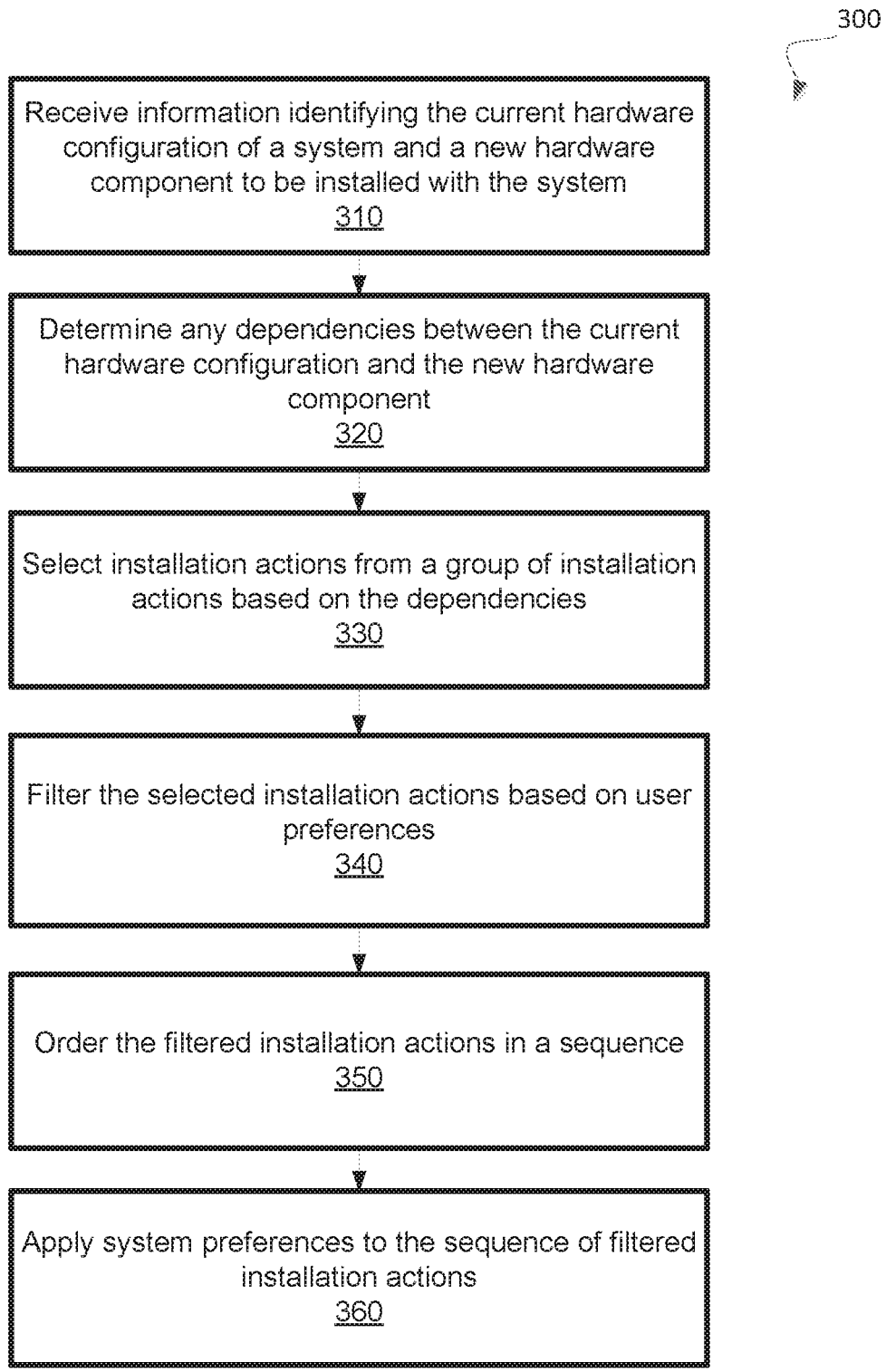
FIG. 3 illustrates an example method to determine a series of installation actions to install a new hardware component with a current hardware configuration in accordance with some embodiments.

FIG. 3 illustrates an example method 300 to determine a series of installation actions to install a new hardware component with a current hardware configuration. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the guide component 130 of FIG. 1 may perform the method 300.

As shown in FIG. 3, the method 300 may begin with the processing logic receiving information identifying the current hardware configuration of a system and a new hardware component to be installed with the system (block 310). For example, a current hardware configuration of a flash storage array system and a flash storage array system component may be identified. The processing logic may subsequently determine dependencies between the new hardware component and the current hardware configuration of the system (block 320). For example, requirements of the new hardware component may be identified. The requirements may indicate particular versions of software, connection types, and so forth that are needed by the new hardware component. The requirements of the new hardware component may be compared with the current hardware configuration of the system to determine whether the current hardware configuration satisfies the requirements of the new hardware component. If the current hardware configuration does not satisfy the requirements, then an installation action may be identified as needing to be performed to satisfy the requirements of the new hardware component. The processing logic may further select installation actions from a group of installation actions based on the dependencies (block 330). For example, different types of installation actions may be selected from different groups of installation actions to install the new hardware component with the current hardware configuration. The processing logic may further filter the selected installation actions based on user preferences (block 340). For example, the selected installation actions may be filtered to remove one or more installation actions that are identified by the user preferences. For example, if an installation action identifies a type of hardware component or software and a series of steps to configure or install the type of hardware component or software and the user preferences identifies that any installation actions of the type of hardware component or software are not to be included in the instruction guide, then the installation action may be removed from the selected installation actions. Furthermore, the processing logic may order the filtered installation actions in a sequence or a series (block 350). Further details with regard to selecting installation actions, filtering installation actions, and ordering installation actions are described in conjunction with FIG. 4.

Referring to FIG. 3, the processing logic may further apply system preferences to the sequence of filtered installation actions (block 360). A descriptive comment or note may be associated or included with a display of certain installation actions based on the system preferences. As an example, the descriptive comment may specify, for a particular installation action that is to be performed with the particular system, a technical support personnel to contact before completing the installation action, may specify for the particular installation action where a particular component (e.g., a cable or connector) may be retrieved, etc. In addition, the system preferences may correspond to a placement and orientation (e.g., a layout) of hardware components of the current hardware configuration of the system. For example, as previously described, a flash storage array system may include storage shelves and storage controllers. The system preferences may specify that the storage shelves are located above, beneath, or adjacent to the storage controllers. The installation actions that are provided in the sequence may be updated to reflect the placement of the hardware components of the current hardware configuration of the system. In some embodiments, the placement of the hardware components may be received via a user input from a graphical user interface. For example, a drag and drop operation may be used to graphically illustrate the placement of the hardware components.

Figure 4:
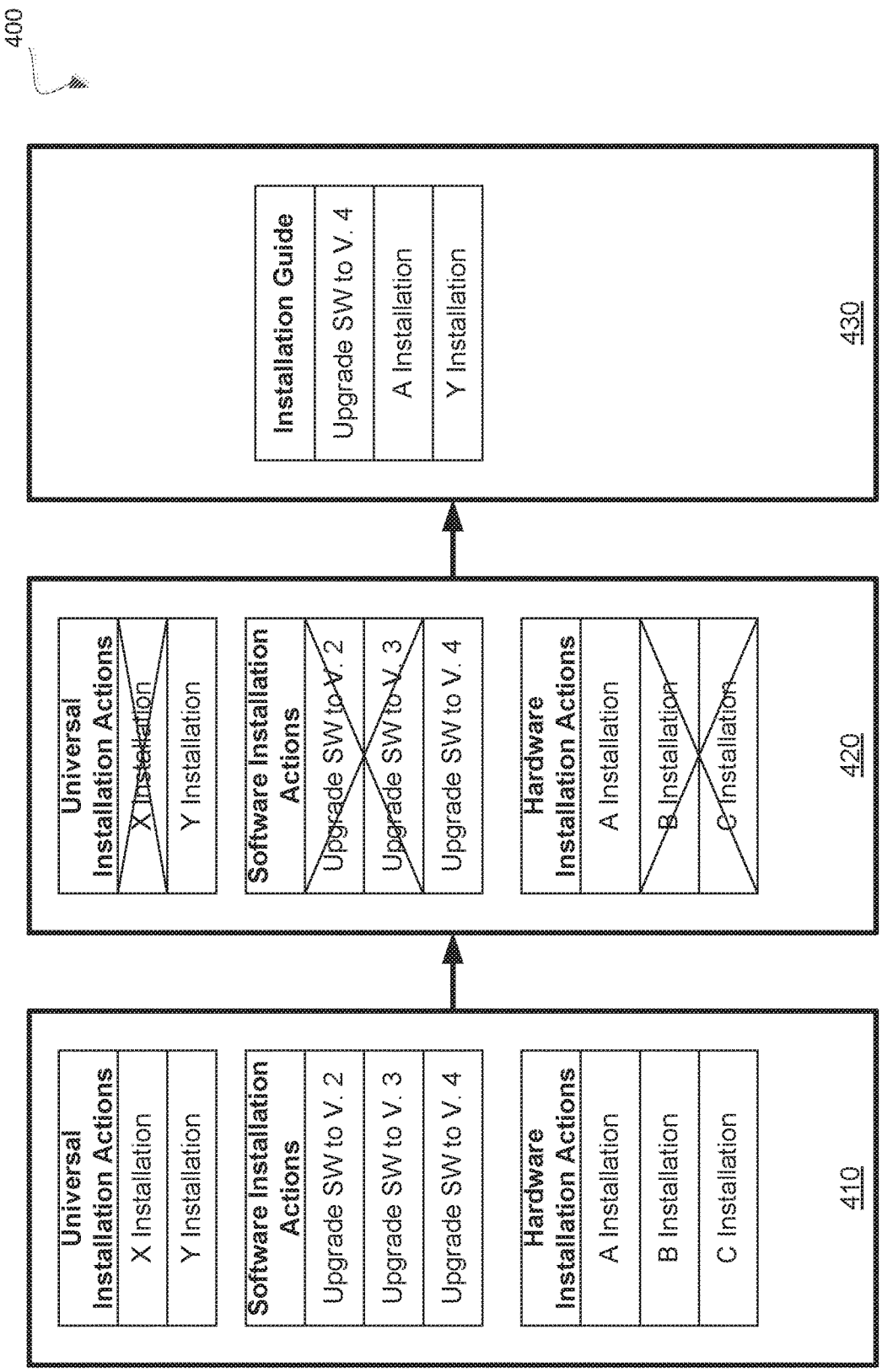
FIG. 4 illustrates an example filtering and ordering of installation actions for an instruction guide in accordance with some embodiments.

FIG. 4 illustrates an example filtering and ordering of installation actions for an instruction guide. In general, the installation actions may be selected, filtered, and ordered by the guide component 130 of FIG. 1.

As shown in FIG. 4, a first set 410 of installation actions may be identified. The first set 410 may provide all installation actions that are currently available. In some embodiments, the first set 410 may be organized into types of installation actions. For example, the installation actions may be grouped into universal installation actions, software installation actions, and hardware installation actions. The second set 420 of installation actions may be identified by selecting and filtering a subset (e.g., a proper subset) of the currently available installation instructions from the first set 410. For example, the installation actions that are identified based on the new hardware component and the current hardware configuration may be identified (e.g., based on any requirements of the new hardware component) and the other installation actions that are not used for installing the new hardware component with the current hardware configuration may be removed. Furthermore, any installation action identified by a user preference that specifies to remove the installation action may be removed. Furthermore, the third set 430 of installation actions may further order the installation actions in a particular series or sequence.

As an example, the new hardware component may require an updated version of software (e.g., version 4), may need to be coupled to other hardware components of the current hardware configuration by a certain type of cable or connector, and may also be associated with certain universal installation actions that are typical of new hardware components. As shown in FIG. 4, the first set 410 may include all types of installation actions that are currently available. The second set 420 may filter the hardware installation actions to remove the 'B Installation' and the 'C Installation' hardware installation actions and select the 'A Installation' instruction to be included in the second set 420. For example, the removed hardware installation actions may be used to couple different hardware components with different types of cables or connectors and the selected hardware installation action may describe how to couple the new hardware component with a cable specific to the new hardware component with the current hardware configuration. Furthermore, the new hardware component may require a certain version of a software operating environment and the current hardware configuration of the system may currently be running another version of the software operating environment. As such, a software installation action to upgrade the software operating environment of the current hardware configuration may be selected so that the requirement of the new hardware component with respect to the software operating environment is satisfied. Additionally, the universal installation actions may be relevant to installing the new hardware component with the current hardware configuration. However, the 'X Installation' may be filtered or removed based on user preferences. For example, the filtered or removed installation action may describe how to install a storage shelf rail to the current hardware configuration and a user preference may specify to filter or remove an installation step describing how to install rails. Thus, the installation action may be removed despite the installation action being relevant for installing the new hardware component with the current hardware configuration. The third set 430 may provide the selected and filtered installation actions in an instruction guide and in a particular order. For example, each of the installation actions may be assigned a value that specifies an order or placement of the installation action relative to other installation actions for being provided in the instruction guide. The selected and filtered installation actions may thus be ordered based on the assigned value for the installation actions.

Figure 5A:
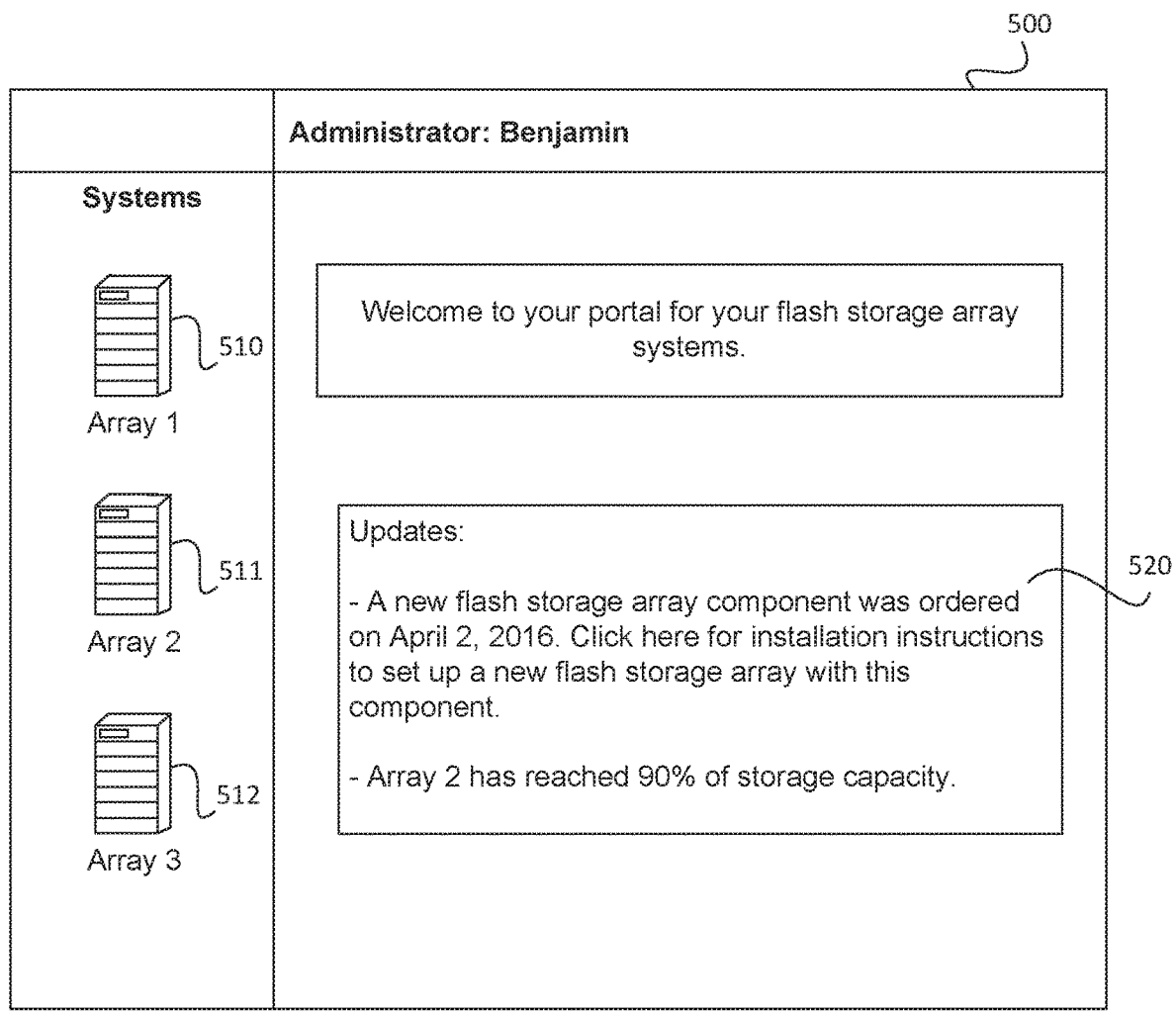
FIG. 5A illustrates an example graphical user interface to generate an instruction guide in accordance with some embodiments of the present disclosure.

FIG. 5A illustrates an example graphical user interface 500 to generate an instruction guide. In general, the graphical user interface 500 may be used to provide an instruction guide 140 of FIG. 1. In some embodiments, the graphical user interface 500 may be provided by the guide component 130 of FIG. 1.

As shown in FIG. 5A, the graphical user interface 500 may identify multiple flash storage array systems that are associated with a user. For example, a user may log in to a service represented by the graphical user interface 500 where the service provides management information for the flash storage array systems that are administered by the user. As shown, the graphical user interface 300 may identify the first flash storage array system 510, second flash storage array system 511, and the third flash storage array system 512 that are each associated with the user. The graphical user interface 500 may provide a message 520 to indicate an option where a user may be provided an instruction guide with installation actions to install a new flash storage array component as a new flash storage array system. In some embodiments, the message 520 may be provided by the GUI when a new hardware component has been ordered by the user and has not been identified as being installed with any of the systems administered by the user. For example, the information received from each of the flash storage array systems 510, 511, and 512 may specify the flash storage array components used in the current hardware configuration of each respective flash storage system. The message 520 may be provided when the new flash storage array component is not identified from the information received from the flash storage array systems 510, 511, and 512. Thus, the graphical user interface 500 may provide an installation option when a new hardware component has been ordered by the user and has not yet been installed as a new flash storage array system or has not been installed with any of the flash storage array systems 510, 511, and 512. In response to the user selecting the message 520, an instruction guide to provide installation actions to install the new flash storage array component as a new flash storage array system may be provided.

Figure 5B:
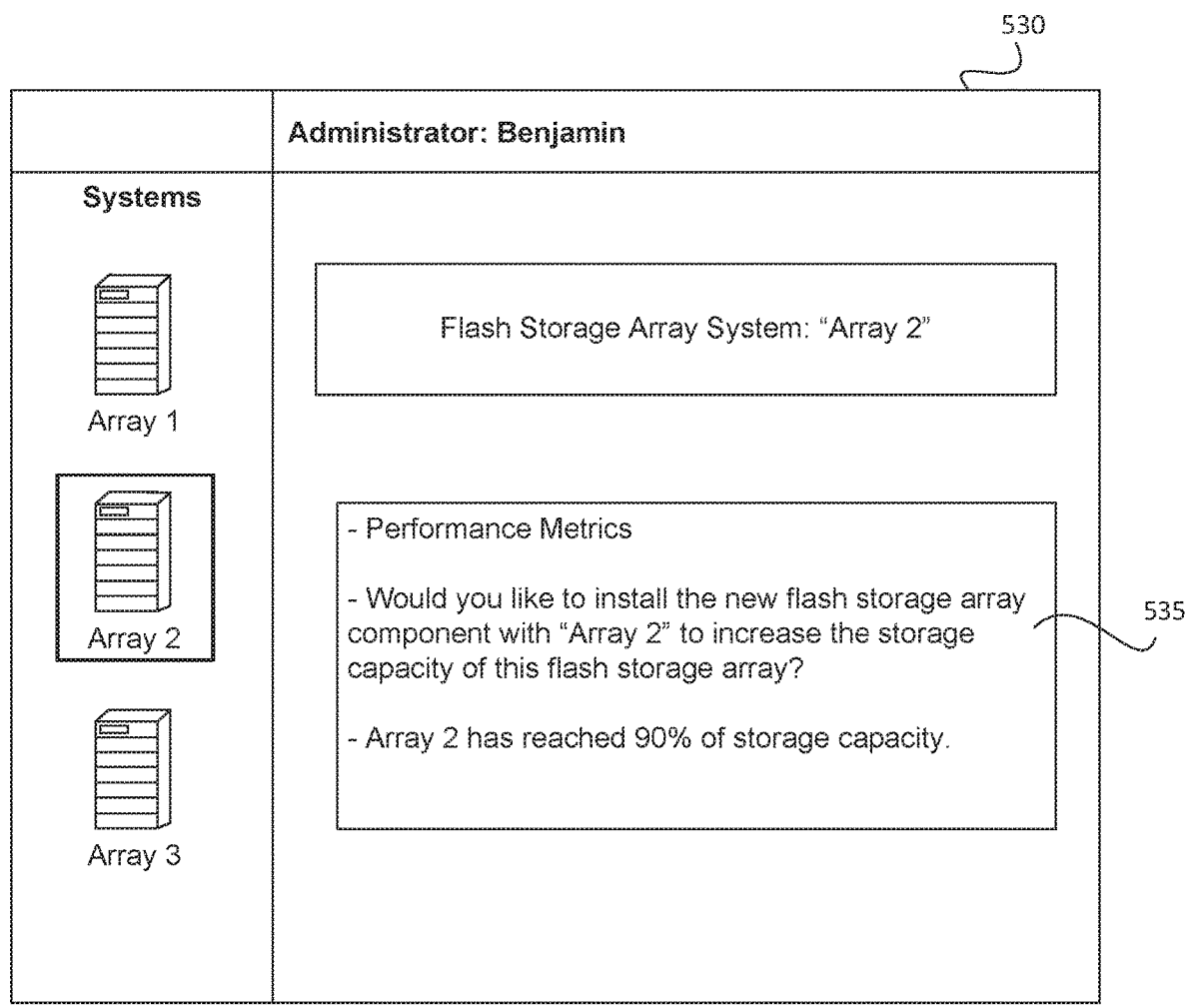
FIG. 5B illustrates another example graphical user interface to generate the instruction guide in accordance with some embodiments of the present disclosure.

FIG. 5B illustrates an example graphical user interface 530. In general, the graphical user interface 530 may correspond to the graphical user interface 500 of FIG. 5A after a user has selected one of the flash storage array systems associated with the user. As shown, the user may select one of the identified flash storage array systems. For example, the second flash storage array system may be selected. In response to the selection of the second flash storage array system from the graphical user interface 530, information of the second flash storage array system may be provided. For example, performance statistics and other such messages indicating a status or capabilities of the second flash storage array system may be provided. The graphical user interface 530 may further provide a message 535 to indicate an option where the user may be provided with an instruction guide to install the new flash storage array component with the currently selected second flash storage array system. Thus, the graphical user interface 530 may provide an installation option when the new hardware component has been ordered by the user and has not yet been installed as a new flash storage array system or has not been installed with any of the flash storage array systems associated with the user. Furthermore, if another flash storage array system associated with the user is selected, then another option to generate another instruction guide to install the new flash storage array component with the other flash storage array system may be provided. Since the current hardware configurations of each of the flash storage array systems may be different, the other instruction guide may provide different installation actions.

Figure 5C:
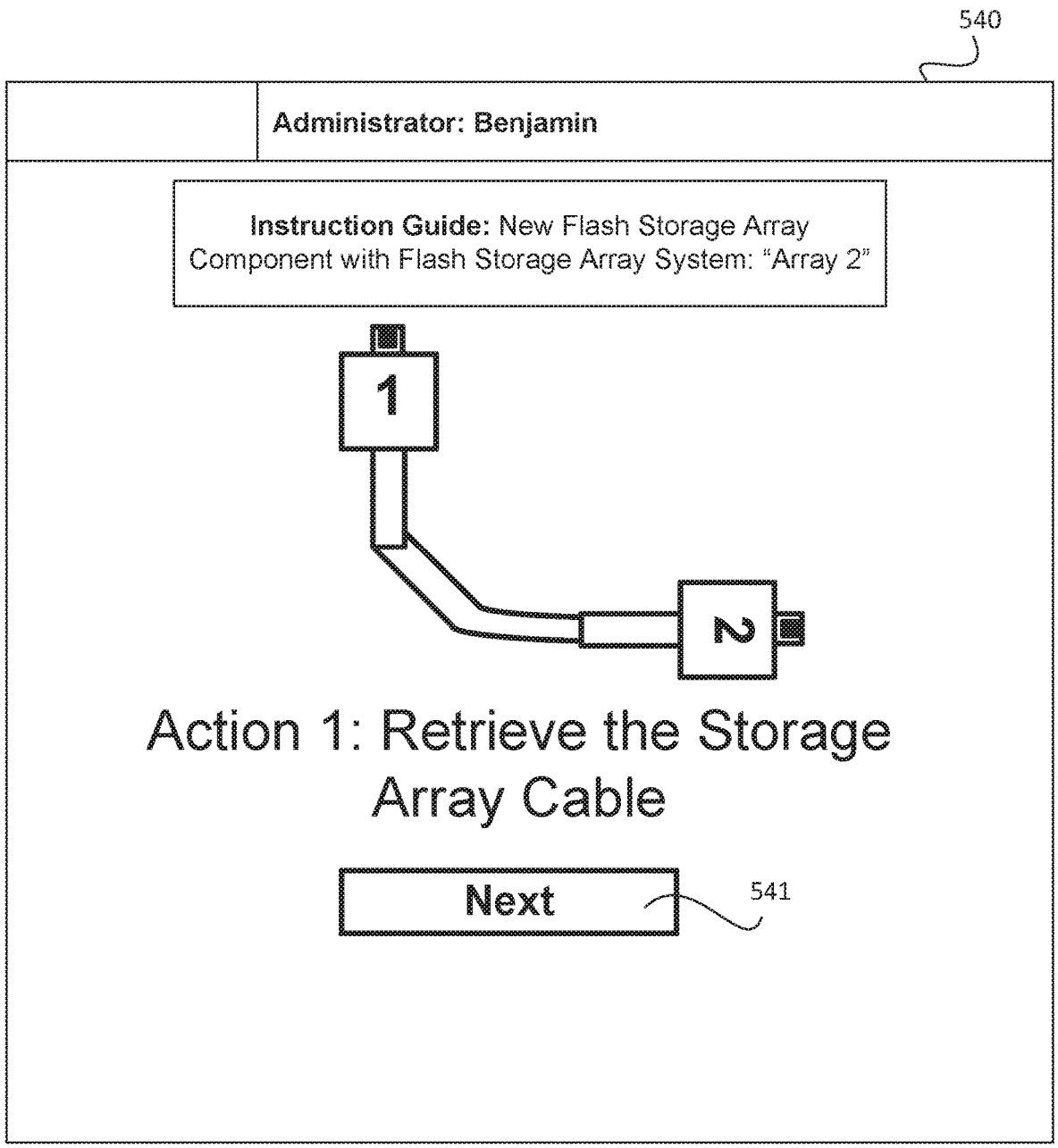
FIG. 5C illustrates the graphical user interface providing a first installation action of the instruction guide in accordance with some embodiments.
Figure 5D:
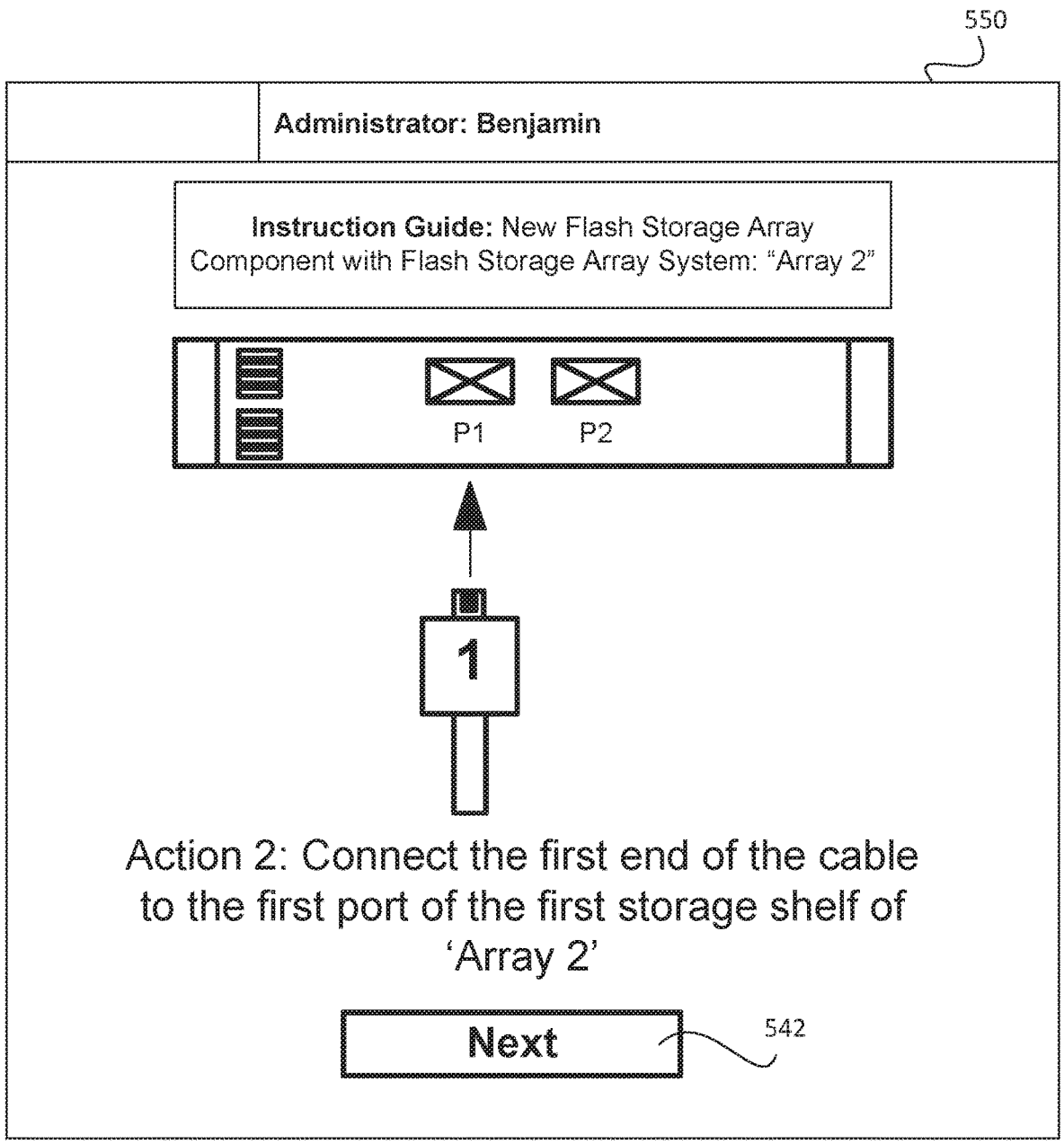
FIG. 5D illustrates the graphical user interface providing a second installation action of the instruction guide in accordance with some embodiments of the present disclosure.
Figure 5E:
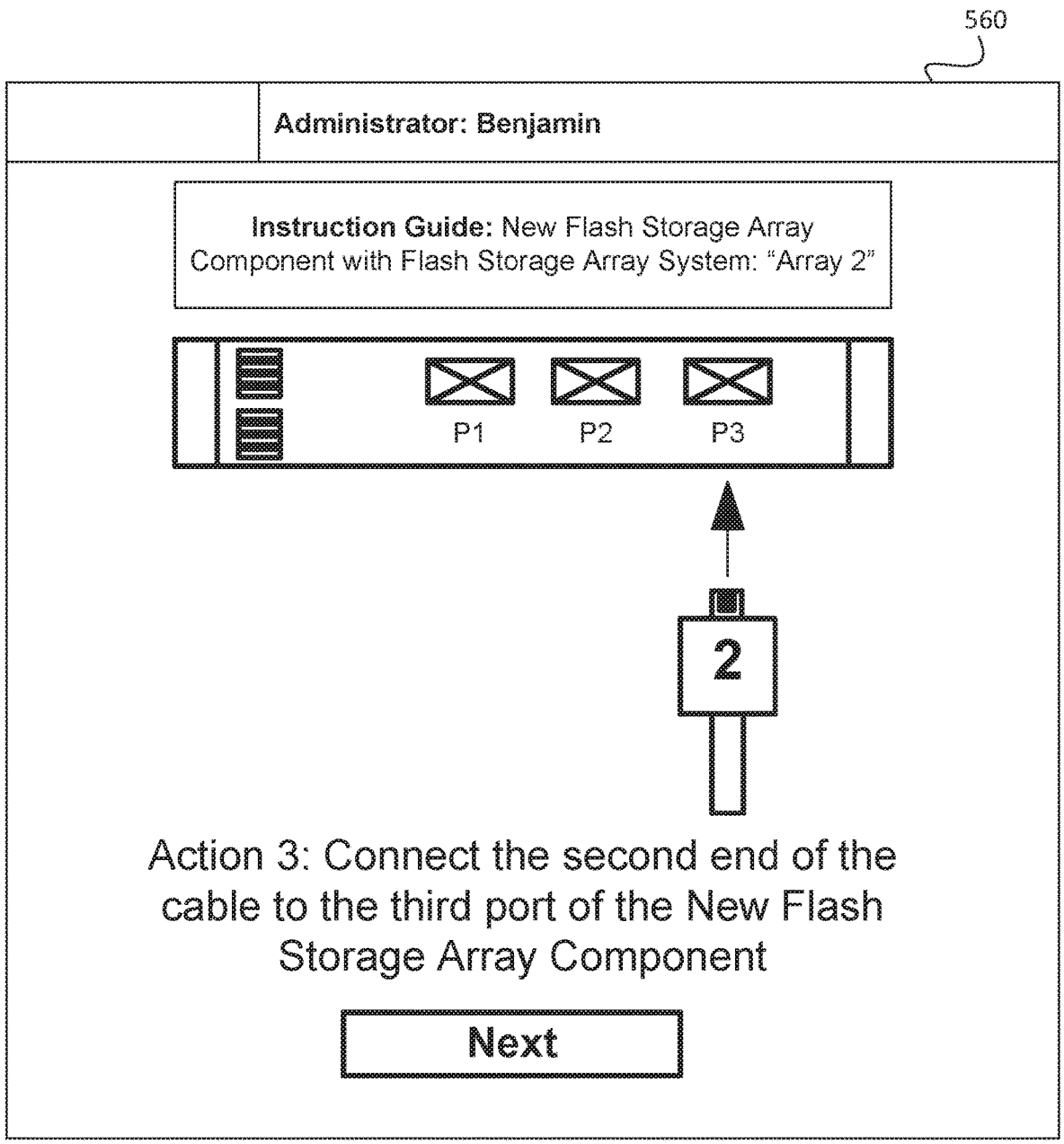
FIG. 5E illustrates the graphical user interface providing a third installation action of the instruction guide in accordance with some embodiments.

FIG. 5C illustrates the graphical user interface 540 providing a first installation action of an instruction guide. For example, the graphical user interface 540 may be provided after the user has selected the message 535 of the graphical user interface 530 of FIG. 5B. For example, a first installation action may be identified. The first installation action may include instructions or a description (e.g., steps) to complete the first installation action and an image corresponding to the first installation action. For example, as shown, the first installation action may indicate that the user is to retrieve a particular type of cable or connector of the flash storage array system. A message 541 may be provided when the user has completed the first installation action so that the user may proceed with a subsequent installation action. In some embodiments, the user may proceed with a subsequent installation action by a user touch motion on a touch screen (e.g., a swiping motion in a particular direction) that provides the graphical user interface 540. For example, in response to receiving the user touch motion, the next installation action may be provided. FIG. 5D illustrates the graphical user interface 550 providing the second installation action of the instruction guide. For example, after the user has selected the message 541, the second installation action may be provided. As shown, the second installation action may identify that the cable or connector is to be connected to a particular port of the new hardware component (e.g., the new storage shelf) that has been ordered by the user. Thus, the installation action may provide an image of the new hardware component that has been ordered and a description of how to perform the installation action. A message 542 may be provided when the user has completed the second installation action so that the third installation action may be shown. FIG. 5E illustrates the graphical user interface 560 providing the third installation action of the instruction guide. For example, the third installation action may identify that the cable or connector is also to be connected to a particular port of another hardware component (e.g., another storage shelf) of the current hardware configuration of the flash storage array system.

The progressing from one installation to the next installation action may be based on a verification process that is performed. For example, if an installation action identifies that an upgrade to software is needed, then an option to proceed to the following installation action may not be provided until a verification that the upgrade to the software has been successfully performed. For example, the information received from the systems may be received and the successful upgrade to the software may be identified from the received information. Thus, the instruction guide may prevent an unsupported action (e.g., a particular action being performed before a prior installation action was successful or an action violating administrator privileges associated with the system).

In some embodiments, the instruction guide may provide a visual element (e.g., a graphical button) to provide an option for the user to request installation assistance with the new hardware component for the current hardware configuration. For example, the user may select the option in the graphical user interface for installation assistance. In response to the user selection, the particular installation action that the graphical user interface is currently displaying, the new hardware component that the user is attempting to install, the current hardware configuration of the flash storage array system, the user's name and the associated company or entity that owns the flash storage array may be transmitted (e.g., to the guide component 130) so that assistance may be provided to the user for the specific installation action that the user is currently viewing. The assistance may be provided via a chat window or box in the graphical user interface, or a telecommunications function, with a technical support provider. An assistance call (e.g., via the telecommunications function) may be routed to particular technical support providers based on the installation action, new hardware component, current hardware configuration, associated company or entity, or any associated service level agreements.

In some embodiments, the display of the installation actions may further be based on additional user display preferences. For example, the user display preferences may be to provide a diagram and no text description for each installation action, or vice versa. Furthermore, the installation actions may be provided via a video based on the user display preference. For example, a single video may provide each of the installation actions. During the playing of the video, the user may pause the video at a particular time and an option to display the instruction guide may be provided. In response to selecting the option to display the instruction guide, the installation action that is shown in the video at the particular time may be illustrated with the associated text description and diagrams (e.g., as shown in FIGS. 5C-5E).

Although FIGS. 5A-5E illustrate installation actions for connecting ends of a cable to a storage shelf and another storage shelf (e.g., the new flash storage array component), the GUI may provide installation actions for installing any hardware component with a system or to install any hardware component as a new system. For example, the installation actions may correspond to installing a blade component to increase the storage capacity and performance of the system. Other such installation procedures may correspond to storage controller upgrades (e.g., from storage controllers with lower performance or capabilities to storage controllers with increased performance or capabilities), installation of new Peripheral Component Interconnect Express (PCIe) cards to enable additional features or capabilities, removal of a storage shelf or another component, replacing chassis of the system, etc.

Figure 6:
FIG. 6 is an example method to generate an instruction guide based on a configuration check in accordance with some embodiments.

FIG. 6 is an example method 600 to generate an instruction guide based on a configuration check. In general, the method 600 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the guide component 130 of FIG. 1 may perform the method 600.

As shown in FIG. 6, the method 600 may begin with the processing logic receiving an indication of an installation of a hardware component with a system (block 610). The indication may correspond to a user completing an instruction guide that has been provided as previously described or may be from a periodic scan of the system over a network. The processing logic may further perform a configuration check for the system (block 620). The configuration check may verify the installation of the system after the new hardware component has been installed. In some embodiments, the configuration check may be performed in response to an input (e.g., from a graphical user interface) to query a system. Subsequently, the processing logic may determine whether the configuration check indicates an error (block 630). If the configuration check does not indicate an error, then an instruction guide may not be generated (block 640). Otherwise, if the configuration check does indicate an error, then the processing logic may generate an instruction guide based on the error, the new hardware component, and the current hardware configuration of the system (block 650). For example, the instruction guide may provide a message indicating that the configuration check of the system has detected an incorrect or unsupported configuration after the installation of the new hardware component, a description as to why the system configuration is incorrect, and one or more actions (e.g., an installation action or another type of action corresponding to the components of the system) that may be performed to resolve the incorrect configuration. The one or more actions may be provided in the same GUI as previously described. In some embodiments, the one or more actions may correspond to an additional instruction guide. For example, the additional instruction guide may be provided after a first guide has been generated to install the new hardware component with the system. In the same or alternative embodiments, the one or more actions may correspond to a first instruction guide that is provided via the GUI. For example, the instruction guide with the one or more actions may be provided without providing a prior instruction guide to install a new hardware component with the system.

Figure 7:
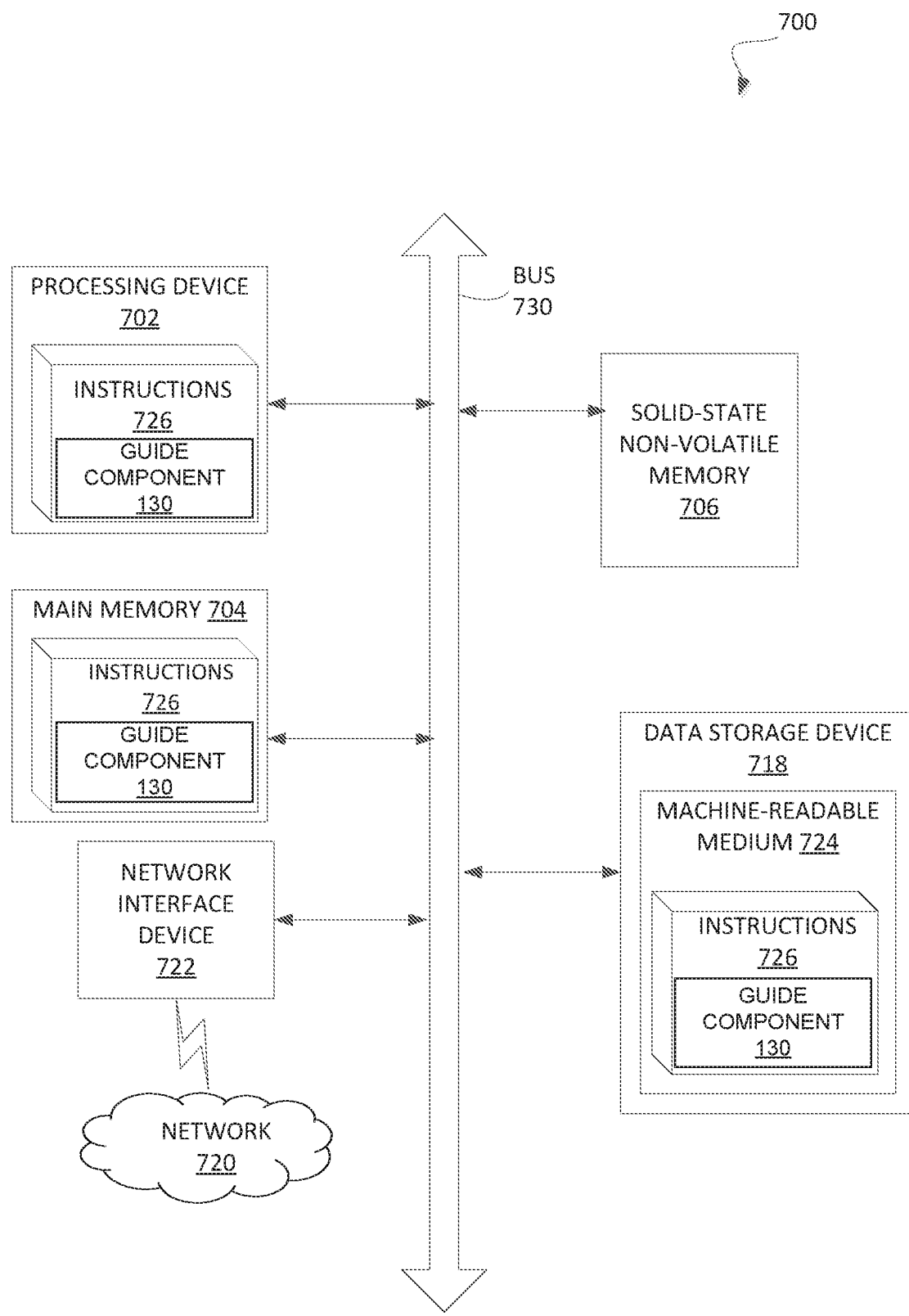
FIG. 7 is a block diagram of an example computer system operating in accordance with the disclosure described herein.

FIG. 7 depicts an example computer system 700 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a solid-state non-volatile memory 706 (e.g., flash memory, 3D crosspoint (XPoint) memory, magnetoresistive random-access memory (MRAM), or any other such storage media), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the transform component 120 for performing the operations and steps discussed herein. The computer system 700 may further include a network interface device 722. The data storage device 716 may include a computer-readable medium 724 on which is stored the guide component 130 embodying any one or more of the methodologies or functions described herein. The guide component 130 may also reside, completely or at least partially, within the main memory 704 and/or within the processing device 702 during execution thereof by the computer system 700, the main memory 704 and the processing device 702 also constituting computer-readable media. The guide component 130 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "providing," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    receiving information identifying a current hardware configuration of a plurality of solid-state storage arrays of a storage system;
    receiving information of a new hardware component that has not been installed, wherein the new hardware component comprises one of a solid-state storage array shelf or blade;
    providing a graphical user interface (GUI) comprising an option to install the new hardware component in the storage system;
    receiving an input corresponding to install the new hardware component with a selected solid-state storage array of the plurality of solid-state storage arrays;
    in response to receiving the input corresponding to install the new hardware component with the selected solid-state storage array, determining, by a processing device, a plurality of actions to install the new hardware component with the current hardware configuration of the selected solid-state storage array wherein the plurality of actions correspond to a software upgrade for the selected solid-state storage array and a coupling of the new hardware component with another hardware component of the current hardware configuration of the selected solid-state storage array with a connector;
    filtering the plurality of actions based on user preferences to remove one or more of the plurality of actions;
    modifying the filtered plurality of actions based on preferences associated with the selected solid-state storage array to generate a modified plurality of actions;
    generating a guide to install the new hardware component with the current hardware configuration of the selected solid-state storage array based on the modified plurality of actions;
    causing display of the guide via the GUI;
    causing each of the plurality of actions to be displayed in the guide via the GUI;
    performing a configuration check of one of the plurality of solid-state storage arrays;
    identifying an error associated with the configuration check of the one of the plurality of solid-state storage arrays;
    determining another plurality of actions to correct the error;
    generating another guide based on the determined another plurality of actions; and
    causing display of the another guide via the GUI.

2. The method of claim 1, wherein the information identifying the current hardware configuration of the plurality of solid-state storage arrays is received from the plurality of solid-state storage arrays via a network, and wherein the information identifies a version of software associated with the current hardware configuration and identifies hardware components used in the current hardware configuration.

3. The method of claim 1, in response to a selection to install the new hardware component with the current hardware configuration of another solid-state storage array, determining a second plurality of actions to install the new hardware component with the current hardware configuration of the another solid-state storage array, wherein the second plurality of actions are different than the plurality of actions.

4. The method of claim 1, further comprising:
    receiving an indication of an installation of the new hardware component with the current hardware configuration of the selected solid-state storage array;
    performing a configuration check of the selected solid-state storage array; and
    in response to determining that the configuration check of the selected solid-state storage array has detected an incorrect configuration, generating a second guide based on an error corresponding to the incorrect configuration, the new hardware component, and the current hardware configuration.

5. The method of claim 1, further comprising:
    receiving information identifying a second new hardware component that is not associated with an installation with any of the plurality of solid-state storage arrays;
    receiving an input to install the second new hardware component as a new solid-state storage array;
    in response to receiving the input to install the second new hardware component as the new solid-state storage array, determining another plurality of actions to install the second new hardware component; and
    generating another guide based on the determined another plurality of actions.

6. The method of claim 1, wherein the solid-state storage array shelf is associated with increasing storage capacity of the selected solid-state storage array.

7. The method of claim 1, wherein the blade is associated with increasing storage capacity and performance of the selected solid-state storage array.

8. The method of claim 1, wherein the GUI identifies the plurality of solid-state storage arrays, wherein the selection to install the new hardware component with the selected solid-state storage array is based on the identified plurality of solid-state storage arrays.

9. A system comprising:
a memory; and
a processing device, operatively coupled with the memory, to:
receive information identifying a current hardware configuration of a plurality of solid-state storage arrays of a storage system;
receive information of a new hardware component that has not been installed, wherein the new hardware component comprises one of a solid-state storage array shelf or blade;
provide a graphical user interface (GUI) comprising an option to install the new hardware component in the storage system;
receive an input corresponding to install the new hardware component with a selected solid-state storage array of the plurality of solid-state storage arrays;
in response to receiving the input corresponding to install the new hardware component with the selected solid-state storage array, determine a plurality of actions to install the new hardware component with the current hardware configuration of the selected solid-state storage array wherein the plurality of actions correspond to a software upgrade for the selected solid-state storage array and a coupling of the new hardware component with another hardware component of the current hardware configuration of the selected solid-state storage array with a connector;
filter the plurality of actions based on user preferences to remove one or more of the plurality of actions;
modify the filtered plurality of actions based on preferences associated with the selected solid-state storage array to generate a modified plurality of actions;
generate a guide to install the new hardware component with the current hardware configuration of the selected solid-state storage array based on the modified plurality of actions;
cause display of the guide via the GUI;
causing each of the plurality of actions to be displayed in the guide via the GUI;
perform a configuration check of one of the plurality of solid-state storage arrays;
identify an error associated with the configuration check of the one of the plurality of solid-state storage arrays;
determine another plurality of actions to correct the error;
generate another guide based on the determined another plurality of actions; and
cause display of the another guide via the GUI.

10. The system of claim 9, wherein the GUI provides another option to install the new hardware component as a new system, and wherein the processing device is further to:
in response to a selection from the GUI of the another option to install the new hardware component as the new system, determine a corresponding plurality of actions to install the new hardware component as the new system.

11. The system of claim 9, wherein to determine the plurality of actions to install the new hardware component with the current hardware configuration of the system, the processing device is further to:

determine whether the new hardware component is associated with a requirement;
in response to determining that the new hardware component is associated with the requirement, determine whether the current hardware configuration of the system satisfies the requirement; and
in response to determining that the current hardware configuration of the system does not satisfy the requirement, identify an action to satisfy the requirement with the current hardware configuration, wherein the plurality of actions comprises the identified action.

12. The system of claim 11, wherein the requirement corresponds to a version of software required by the new hardware component, wherein the current configuration of the system does not satisfy the requirement when the version of the software currently used by the hardware configuration of the system is not the version of the software required by the new hardware component, and wherein the identified action corresponds to an upgrade operation of the software currently used by the hardware configuration of the system to the version of the software required by the new hardware component.

13. The system of claim 9, wherein the processing device is further to:
receive a user preference associated with an installation of the new hardware component; and
filter the plurality of actions based on the user preference to remove one or more of the plurality of actions, wherein the guide is further generated based on the filtered plurality of actions.

14. The system of claim 9, wherein the GUI identifies a plurality of systems, and wherein the selection from the GUI of the option to install the new hardware component with the system is based on a selection of the system from the identified plurality of systems from the GUI.

15. The system of claim 9, wherein the information identifying the current hardware configuration of the system is received from at least one of over a network from the system or from a physical connection with the system, and wherein the information of the new hardware component is received from at least one of a radio frequency identification (RFID) signal, an optical scan, or a database system.

16. The system of claim 9, wherein the processing device is further to:
receive a preference associated with the system, wherein the guide is further based on the preference associated with the system.

17. The system of claim 9, wherein the processing device is further to:
receive an input, via the GUI, specifying a layout of the current hardware configuration of the system, wherein the guide is further based on the specified layout of the current hardware configuration of the system.

18. A non-transitory computer readable storage medium storing instructions, which when executed, cause a processing device to:
receive information identifying a current hardware configuration of a plurality of solid-state storage arrays of a storage system;
receive information of a new hardware component that has not been installed, wherein the new hardware component comprises one of a solid-state storage array shelf or blade;
provide a graphical user interface (GUI) comprising an option to install the new hardware component in the storage system;

receive an input corresponding to install the new hardware component with a selected solid-state storage array of the plurality of solid-state storage arrays;

in response to receiving the input corresponding to install the new hardware component with the selected solid-state storage array, determine, by the processing device, a plurality of actions to install the new hardware component with the current hardware configuration of the selected solid-state storage array wherein the plurality of actions correspond to a software upgrade for the selected solid-state storage array and a coupling of the new hardware component with another hardware component of the current hardware configuration of the selected solid-state storage array with a connector;

filter the plurality of actions based on user preferences to remove one or more of the plurality of actions;

modify the filtered plurality of actions based on preferences associated with the selected solid-state storage array to generate a modified plurality of actions;

generate a guide to install the new hardware component with the current hardware configuration of the selected solid-state storage array based on the modified plurality of actions;

cause display of the guide via the GUI;

causing each of the plurality of actions to be displayed in the guide via the GUI;

perform a configuration check of one of the plurality of solid-state storage arrays;

identify an error associated with the configuration check of the one of the plurality of solid-state storage arrays;

determine another plurality of actions to correct the error;

generate another guide based on the determined another plurality of actions; and cause display of the another guide via the GUI.

19. The non-transitory computer readable storage medium of claim 18, wherein to determine the plurality of actions to install the new hardware component with the current hardware configuration of the system, the processing device is further to:

determine whether the new hardware component is associated with a requirement;

in response to determining that the new hardware component is associated with the requirement, determine whether the current hardware configuration of the system satisfies the requirement; and in response to determining that the current hardware configuration of the system does not satisfy the requirement, identify an action to satisfy the requirement with the current hardware configuration, wherein the plurality of actions comprises the identified action.

20. The non-transitory computer readable storage medium of claim 19, wherein the requirement corresponds to a version of software required by the new hardware component, wherein the current configuration of the system does not satisfy the requirement when the version of the software currently used by the hardware configuration of the system is not the version of the software required by the new hardware component, and wherein the identified action corresponds to an upgrade operation of the software currently used by the hardware configuration of the system to the version of the software required by the new hardware component.

21. The non-transitory computer readable storage medium of claim 18, wherein the processing device is further to:

receive a user preference associated with an installation of the new hardware component; and filter the plurality of actions based on the user preference to remove one or more of the plurality of actions, wherein the guide is further generated based on the filtered plurality of actions.

22. The non-transitory computer readable storage medium of claim 18, wherein the GUI identifies a plurality of systems, and wherein the selection from the GUI of the option to install the new hardware component with the system is based on a selection of the system from the identified plurality of systems from the GUI.

23. The non-transitory computer readable storage medium of claim 18, wherein the information identifying the current hardware configuration of the system is received from at least one of over a network from the system or from a physical connection with the system, and wherein the information of the new hardware component is received from at least one of a radio frequency identification (RFID) signal, an optical scan, or a database system.

\* \* \* \* \*